(12) United States Patent
Smirnov

(10) Patent No.: US 8,837,079 B1
(45) Date of Patent: Sep. 16, 2014

(54) SPINDLE MOTOR AND HARD DISK DRIVE INCLUDING THE SAME

(71) Applicant: Samsung Electro-Mechanics Co., Ltd., Suwon (KR)

(72) Inventor: Viatcheslav Smirnov, Suwon (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 13/944,535

(22) Filed: Jul. 17, 2013

(30) Foreign Application Priority Data

Mar. 15, 2013 (KR) ........................ 10-2013-0028273

(51) Int. Cl.
*G11B 17/02* (2006.01)

(52) U.S. Cl.
USPC ....................................... 360/99.08

(58) Field of Classification Search
USPC ..................................... 360/99.08
See application file for complete search history.

(56) References Cited

U.S. PATENT DOCUMENTS

| | | | | |
|---|---|---|---|---|
| 7,365,939 B2 * | 4/2008 | Gomyo et al. | ............. | 360/99.08 |
| 8,212,459 B2 * | 7/2012 | Smirnov et al. | ............... | 310/425 |
| 8,300,355 B2 * | 10/2012 | Yang | ......................... | 360/99.08 |
| 8,315,012 B2 * | 11/2012 | Himeno et al. | ............. | 360/99.08 |
| 8,359,608 B2 * | 1/2013 | Kim et al. | ...................... | 720/697 |
| 8,472,132 B2 * | 6/2013 | Yamada et al. | ............. | 360/99.08 |
| 8,508,883 B2 * | 8/2013 | Tamaoka et al. | ........... | 360/99.08 |
| 2008/0158729 A1 | 7/2008 | Tamaoka | | |

FOREIGN PATENT DOCUMENTS

| | | |
|---|---|---|
| JP | 2008-167521 | 7/2008 |
| JP | 2009-204019 | 9/2009 |

* cited by examiner

*Primary Examiner* — Mark Blouin

(57) ABSTRACT

There is provided a spindle motor, including: a rotating member including a shaft having a fixing groove disposed in a lower portion thereof, a hub base extending from an upper end of the shaft in an outer radial direction, and a magnet support part extending from an outer edge of the hub base downwardly in an axial direction; a sleeve rotatably supporting the rotating member; and a stopper including a fixed part inserted into the fixing groove and a flange part extending from an end of the fixed part in the outer radial direction, wherein the flange part includes a groove part formed by being recessed inwardly and an extension part extending from the groove part in the outer radial direction.

15 Claims, 12 Drawing Sheets

SPINDLE MOTOR AND HARD DISK DRIVE INCLUDING THE SAME

CROSS-REFERENCE TO RELATED APPLICATIONS

This application claims the priority of Korean Patent Application No. 10-2013-0028273 filed on Mar. 15, 2013, in the Korean Intellectual Property Office, the disclosure of which is incorporated herein by reference.

BACKGROUND OF THE INVENTION

1. Field of the Invention

The present invention relates to a spindle motor and a hard disk drive including the same.

2. Description of the Related Art

A hard disk drive (HDD), an information storage device, reads data stored on a disk or writes data to a disk using a read/write head.

A hard disk drive requires a disk driving device capable of driving the disk. As the disk driving device, a spindle motor is commonly used.

Such a spindle motor uses a hydrodynamic bearing assembly. A shaft, a rotating member of the hydrodynamic bearing assembly, and a sleeve, a fixed member thereof, have a lubricating fluid interposed therebetween, such that the shaft is supported by fluid pressure generated in the lubricating fluid.

Thus, demand for thin, high-capacity spindle motors has continuously increased. In accordance with the thinning and miniaturization of such spindle motors, bearing rigidity has been unavoidably reduced.

Bearing rigidity, an important factor determining rotational characteristics of the spindle motor, is affected by a gap between dynamic pressure grooves, that is, a bearing span length.

That is, bearing rigidity is increased with increases in bearing span length, such that rotational characteristics of the spindle motor may be improved. Therefore, even in the case that the capacity of the spindle motor is increased and the spindle motor is thinned, bearing rigidity should not be affected thereby.

In addition, the lubricating fluid injected into the hydrodynamic bearing assembly may be leaked to the outside due to an external impact or the amount thereof may be reduced due to evaporation. Due to the above-mentioned phenomena, the hydrodynamic bearing may not be able to generate sufficient fluid dynamic pressure, which may lead problems in terms of the performance and lifespan of a spindle motor.

Further, when an external impact is transferred to a spindle motor from the outside during the driving thereof, internal components in the spindle motor may be deformed, having an adverse affect on the driving of the spindle motor. Therefore, it is important to secure rigidity in the spindle motor.

Therefore, research into increasing the rigidity of the spindle motor to prevent the internal components from being deformed even when an external impact or the like is applied to the spindle motor, securing a storage space for lubricating fluid to maximize motor performance and lifespan, and preventing bearing rigidity from being reduced while realizing high-capacity and miniaturization of the spindle motor, has been urgently demanded.

SUMMARY OF THE INVENTION

An aspect of the present invention provides a spindle motor having increased rigidity and a storage space for lubricating fluid.

Another aspect of the present invention provides a spindle motor capable of simplifying a manufacturing process and saving manufacturing costs, by reducing an amount of components included in the spindle motor.

Another aspect of the present invention provides a spindle motor capable of increasing bearing rigidity with an increase in a bearing span length while satisfying a demand for miniaturization and thinness of the spindle motor.

According to an aspect of the present invention, there is provided a spindle motor, including: a rotating member including a shaft having a fixing groove disposed in a lower portion thereof, a hub base extending from an upper end of the shaft in an outer radial direction, and a magnet support part extending from an outer edge of the hub base downwardly in an axial direction; a sleeve rotatably supporting the rotating member; and a stopper including a fixed part inserted into the fixing groove and a flange part extending from an end of the fixed part in the outer radial direction, wherein the flange part includes a groove part formed by being recessed inwardly and an extension part extending from the groove part in the outer radial direction.

The extension may be thicker than the groove part.

A lower portion of the sleeve may be provided with a receiving groove recessed inwardly therefrom and the receiving groove may have the extension part received therein.

A lower end of the sleeve may be provided with a protrusion and the protrusion may be received by the groove part.

The groove part may be formed to be rounded.

The rotating member may include a main wall part protruding from a surface thereof downwardly in the axial direction and facing the sleeve, and a lubricating fluid may be sealed between an inner circumferential surface of the main wall part and an outer circumferential surface of the sleeve.

The sleeve may include a first outer circumferential surface and a second outer circumferential surface protruding in the outer radial direction further than the first outer circumferential surface, and the main wall part may include a first inner circumferential surface facing the first outer circumferential surface of the sleeve and a second inner circumferential surface facing the second outer circumferential surface of the sleeve.

The lubricating fluid may be sealed between the second outer circumferential surface of the sleeve and the second inner circumferential surface of the main wall part.

The sleeve may be provided with a bypass channel penetrating through upper and lower portions of the sleeve.

According to another aspect of the present invention, there is provided a spindle motor, including: a rotating member including a shaft having a fixing groove disposed in a lower portion thereof, a hub base extending from an upper end of the shaft in an outer radial direction, and a magnet support part extending from an outer edge of the hub base downwardly in an axial direction; a shaft housing into which the shaft is inserted; a sleeve rotatably supporting the shaft housing; and a stopper including a fixed part inserted into the fixing groove and a flange part extending from an end of the fixed part in the outer radial direction, wherein the flange part includes a groove part formed by being recessed inwardly and an extension part extending from the groove part in the outer radial direction.

The extension may be thicker than the groove part.

A lower portion of the sleeve may be provided with a receiving groove recessed inwardly therefrom and the receiving groove may have the extension part received therein.

A lower end of the sleeve may be provided with a protrusion and the protrusion may be received by the groove part.

A hard disk drive, including: the spindle motor as described above rotating a disk using power applied thereto through a substrate; a magnetic head recording and reproducing data on the disk; and a head driving unit moving the magnetic head to a predetermined position above the disk.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
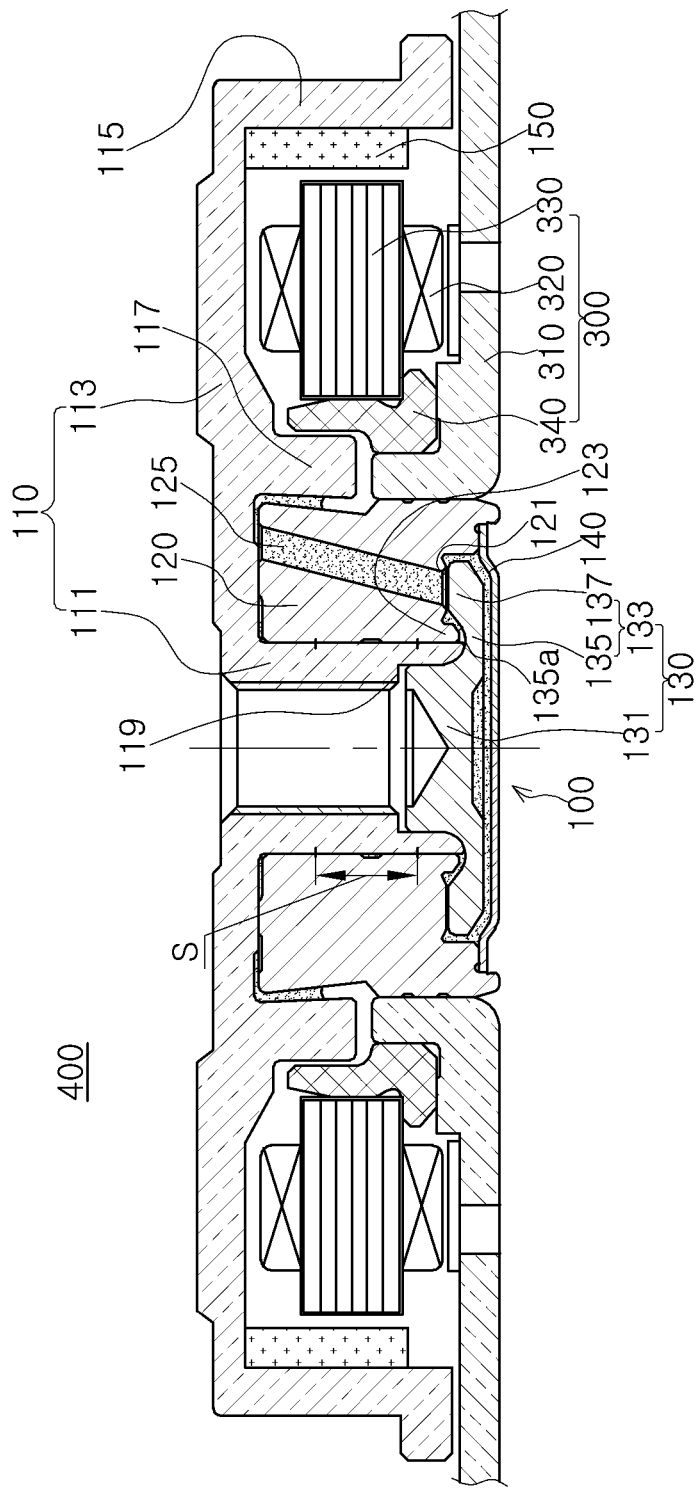
FIG. 1 is a schematic cross-sectional view of a spindle motor according to a first embodiment of the present invention.

Hereinafter, embodiments of the present invention will be described in detail with reference to the accompanying drawings.

The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of components may be exaggerated for clarity, and the same reference numerals will be used throughout to designate the same or like components.

Figure 2:
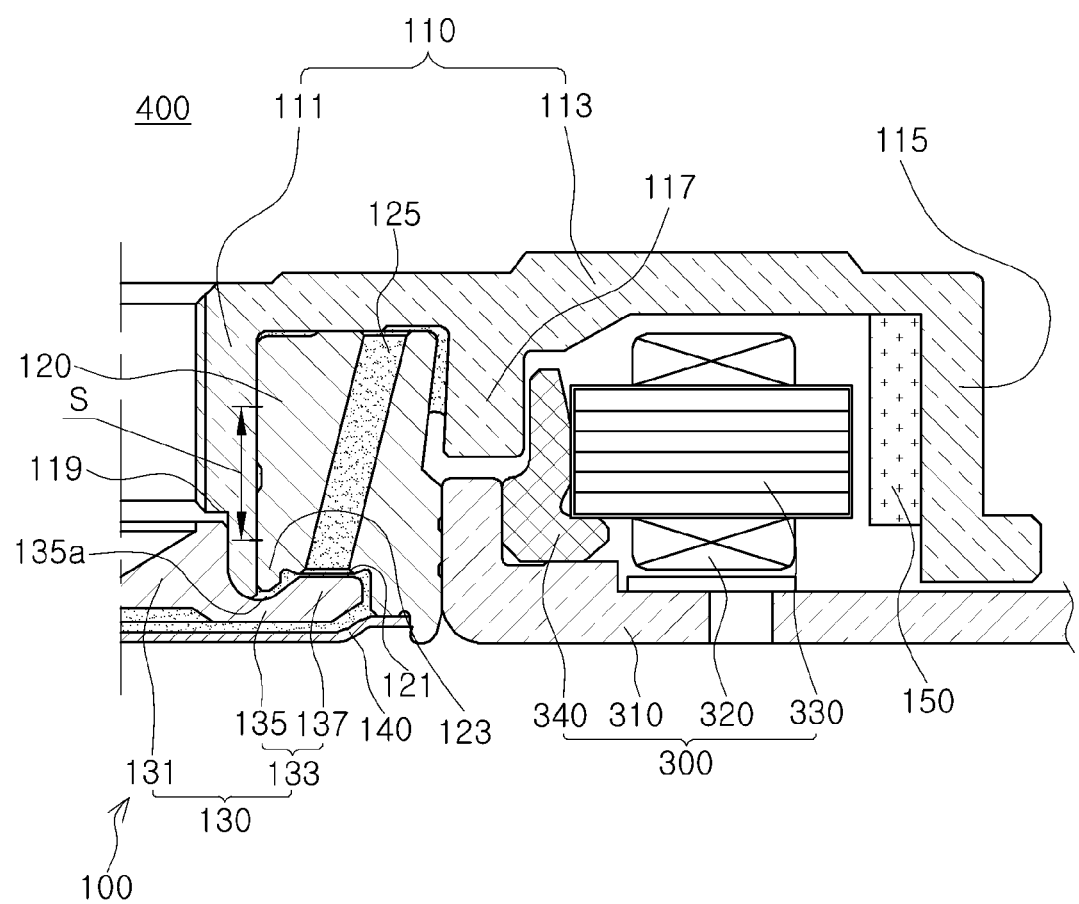
FIG. 2 is a half cross-sectional view of the spindle motor according to the first embodiment of the present invention.
Figure 3:
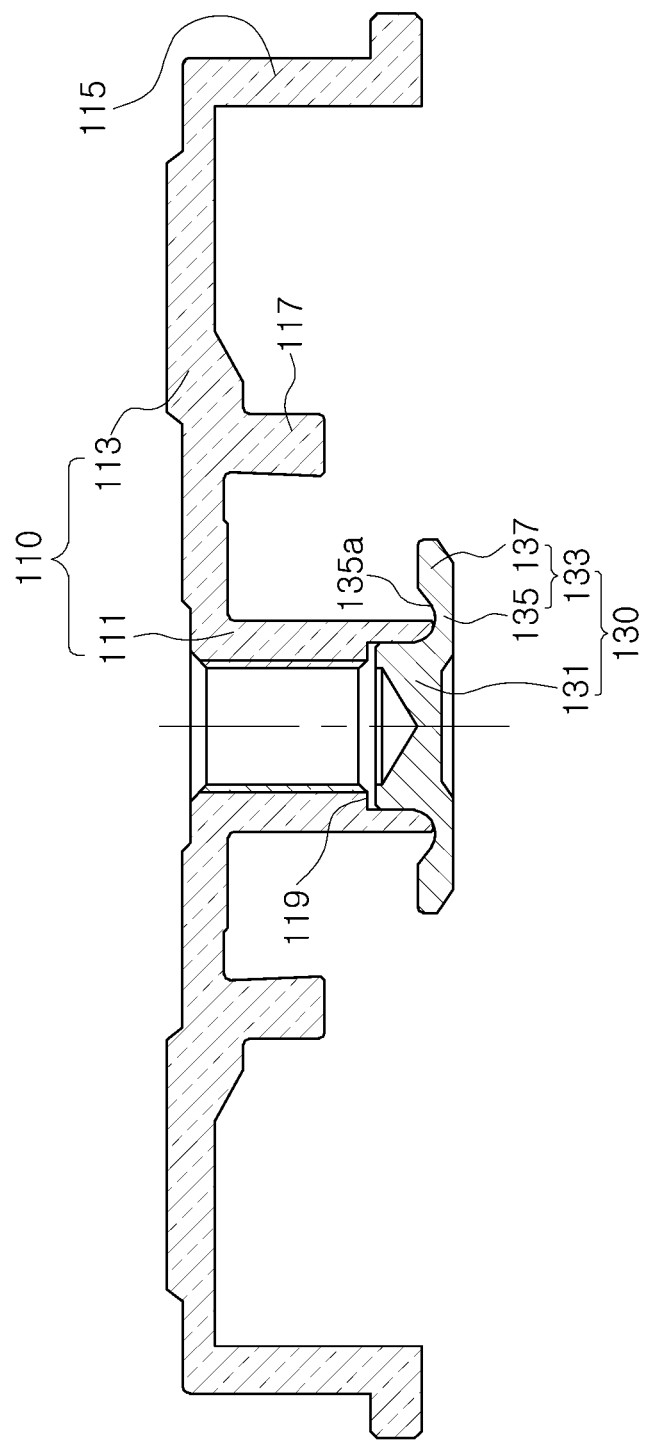
FIG. 3 is a cross-sectional view of a rotating member and a stopper of the spindle motor according to the first embodiment of the present invention.

FIG. 1 is a schematic cross-sectional view of a spindle motor according to a first embodiment of the invention, FIG. 2 is a half cross-sectional view of the spindle motor according to the first embodiment of the invention, and FIG. 3 is a cross-sectional view of a rotating member and a stopper of the spindle motor according to the first embodiment of the invention.

Referring to FIGS. 1 through 3, a spindle motor 400 according to the first embodiment of the invention may include a hydrodynamic bearing assembly 100 and a fixed member, that is, a stator 300.

First, terms with respect to directions will be defined. As viewed in FIG. 1, an axial direction refers to a vertical direction, based on a shaft 111, and an outer radial direction or an inner radial direction refers to a direction towards an outer edge of the rotating member, based on the shaft 111 or a direction towards the shaft 111, based on the edge of the rotating member.

The hydrodynamic bearing assembly 100 may include a rotating member 110 including the shaft 111, a sleeve 120, a stopper 130, and a cover plate 140.

The shaft 111 may configure the rotating member 110, along with a hub base 113 and a magnet support part 115, and may rotate relatively with respect to the fixed member.

The rotating member 110 may include the shaft 111 inserted into a shaft hole of the sleeve 120, the hub base 113 extending from an upper end of the shaft 111 in an outer radial direction, and the magnet support part 115 extending from an outer edge of the hub base 113, downwardly in an axial direction.

The shaft, the hub base, and the magnet support part may be prepared separately and be coupled to each other to configure the rotating member. However, in the spindle motor 400 according to the first embodiment of the invention, the shaft 111, the hub base 113, and the magnet support part 115 may be integrally formed as the rotating member 110.

When the shaft 111, the hub base 113, and the magnet support part 115 are integrally formed as the rotating member 110, a repeatable run out (RRO) may be reduced to minimize micro vibrations, thereby maximizing the performance of the spindle motor.

The rotating member 110 may be a rotating structure rotatably provided with respect to the stator 300 and including an annular ring-shaped magnet 150 disposed on an inner circumferential surface thereof, in which the annular ring-shaped magnet 150 faces the core 330, having a predetermined gap therebetween.

The magnet support part 115 included in the rotating member 110 may be disposed to be bent from the hub base 113 downwardly in the axial direction to support the annular ring-shaped magnet 150.

Further, as the annular ring-shaped magnet 150, a permanent magnet generating magnetic force having a predetermined strength by alternately magnetizing an N pole and an S pole thereof in a circumferential direction may be used.

Rotational driving of the rotating member 110 will be briefly described hereinafter. When power is supplied to a coil 320 wound around the core 330, driving force sufficient to rotate the rotating member 110 may be generated by electromagnetic interaction between the annular ring-shaped magnet 150 and the core 330 having the coil 320 wound therearound.

Therefore, the rotating member 110 may rotate relatively with respect to the fixed member.

Meanwhile, the hub base 113 configuring the rotating member 110 may be provided with a main wall part 117 protruding from one surface of the hub base 113 downwardly in the axial direction.

An inner circumferential surface of the main wall part 117 may face an outer circumferential surface of the sleeve 120, a fixed member, and a lubricating fluid may be sealed between the inner circumferential surface of the main wall part 117 and the outer circumferential surface of the sleeve 120.

In this case, for the sealing of the lubricating fluid, at least one of the inner circumferential surface of the main wall part 117 and the outer circumferential surface of the sleeve 120 may be formed to be tapered.

The sleeve 120 may rotatably support the rotating member including the shaft 111 and may be formed by forging Cu or Al or sintering a Cu—Fe-based alloy powder or an SUS-based powder.

Here, the shaft 111 may be inserted into the shaft hole of the sleeve 120, having a micro clearance between the shaft 111 and the shaft hole of the sleeve 120. The micro clearance may be filled with a lubricating fluid, and the rotation of the shaft 111 may be more smoothly supported by a radial dynamic pressure groove (not shown) formed in at least one of an outer diameter of the shaft 111 and an inner diameter of the sleeve 120.

The radial dynamic pressure groove may be formed in an inner circumferential surface of the sleeve 120, an inner portion of the shaft hole of the sleeve 120, and generate pressure so that the shaft 111 may smoothly rotate in a state in which the shaft 111 is spaced apart from the inner circumferential surface of the sleeve 120 by a predetermined interval at the time of rotation of the shaft 111.

However, as described above, the radial dynamic pressure groove is not limited to being disposed in the inner circumferential surface of the sleeve 120. Therefore, it is to be noted that the radial dynamic pressure groove may also be disposed in an outer circumferential surface of the shaft 111 and the number of radial dynamic pressure grooves is not limited.

The radial dynamic pressure groove may have any one of a herringbone pattern, a spiral pattern, and a helical pattern. However, the radial dynamic pressure groove may have any pattern as long as it may generate radial dynamic pressure.

In addition, a thrust dynamic pressure groove (not shown) may be formed in at least one of an upper surface of the sleeve 120 and one surface of the hub base 113 of the rotating member 110 facing the upper surface of the sleeve 120, and the shaft 111 may rotate in a state in which the shaft 111 secures a predetermined amount of floating force by the thrust dynamic pressure groove.

Here, the thrust dynamic pressure groove may have a herringbone pattern, a spiral pattern, or a helical pattern, similar to the radial dynamic pressure groove. However, the thrust dynamic pressure groove is not necessarily limited thereto, and therefore may have any pattern as long as it may provide thrust dynamic pressure.

In addition, the sleeve 120 may have at least one bypass channel 125 formed therein so as to allow upper and lower portions thereof to be in communication with each other.

The bypass channel 125 may have various shapes so as to allow the upper and lower portions of the sleeve 120 to be in communication with each other.

The bypass channel 125 may disperse the pressure of the lubricating fluid to maintain a balance in pressure and move air bubbles, or the like, present in the lubricating fluid, so as to be discharged by circulation.

Meanwhile, the lower portion of the shaft 111 may be provided with a fixing groove 119 to which the stopper 130 may be fixed.

The stopper 130 may include a fixed part 131 inserted into the fixing groove 119 and a flange part 133 extending from an end of the fixed part 131 in the outer radial direction.

The flange part 133 may be extended in the outer radial direction further than the outer circumferential surface of the shaft 111.

Therefore, when the shaft 111 of the rotating member 110 overfloats, an upper surface of the flange part 133 may be caught by a lower surface of the sleeve 120 to prevent the rotating member 110 from overfloating.

In addition, a thrust dynamic pressure groove (not shown) may be formed in at least one of the lower surface of the sleeve 120 and the upper surface of the flange part 133 facing the lower surface of the sleeve 120, and the shaft 111 may rotate in a state in which the shaft 111 secures a predetermined amount of floating force through the thrust dynamic pressure groove.

Here, the thrust dynamic pressure groove may have a herringbone pattern, a spiral pattern, or a helical pattern, similar to the radial dynamic pressure groove. However, the thrust dynamic pressure groove is not necessarily limited thereto, and therefore may have any pattern as long as it may provide thrust dynamic pressure.

Further, the upper surface of the flange part 133 may be provided with a groove 135a, formed by being recessed inwardly therefrom.

In the flange part 133, a position in which the groove 135a is formed may be defined by a groove part 135 and a position in which the groove 135a is not formed may be defined by an extension part 137.

That is, the extension part 137 may be extended from the groove part 135 in the outer radial direction.

An upper surface of the extension part 137 may be provided with the thrust dynamic groove, but the embodiment of the invention is not limited thereto.

The groove part 135 may be recessed inwardly from the upper surface of the flange part 133, and therefore a thickness of the extension part 137 may be greater than that of the groove part 135.

Meanwhile, the lower portion of the sleeve 120 may be provided with a receiving groove 121 recessed inwardly therefrom and the receiving groove 121 may have the extension part 137 received therein.

Further, a lower end of the sleeve 120 may be provided with a protrusion 123 which may be received by the groove 135a.

In this case, the groove 135a may be rounded inwardly from the upper surface of the flange part 133. However, the shape of the groove 135a is not limited thereto, and therefore the groove 135a may have various shapes, such as a quadrangular shape, and the like, as long as the groove 135a may receive the protrusion 123.

In order to prevent the flange part 133 from being damaged or the stopper 130 from separating from the shaft 111 due to an external impact, and the like, there is a need for the thickness of the flange part 133 to be sufficiently thick.

However, when the thickness of the flange part 133 is formed to be sufficiently thick, a bearing span length S may be insufficient.

The bearing span length S may refer to a distance between points at which a maximum pressure is generated by the radial dynamic groove.

As the distance increases, the rotation of the shaft may be stably supported. When the bearing span length S is short, eccentricity may occur at the time of the rotation of the shaft and bearing rigidity may be reduced.

However, in the spindle motor 400 according to the first embodiment of the invention, the thickness of the extension part 137 of the flange part 133 may be formed to be greater than that of the groove part 135, the extension part 137 may be received by the receiving groove 121, and the protrusion 123 may be received by the groove 135a.

That is, the bearing span length S may be maintained to be the same or the bearing span length S may even be increased, while allowing the flange part 133 to be sufficiently thick.

That is, the rigidity of the spindle motor may be secured while maintaining the optimal bearing span length S.

The cover plate 140 may be coupled to the sleeve 120 so as to maintain a clearance between the shaft 111 and the lower portion of the sleeve 120.

The cover plate 140 may support a lower surface of the shaft 111 by having the lubricating fluid received in a clearance formed between the cover plate 140 and the sleeve 120.

In this case, as a method of fixing the cover plate 140, there may be several available methods, such as a welding method, a caulking method, a bonding method, and the like. Here, the methods may be optionally employed depending on a structure and a process of a product.

The stator 300 may include the coil 320, the core 330, a holder 340, and a base member 310.

The stator 300 may be a fixed structure including the core 330 having the coil 320 wound therearound, in which the coil 320 generates electromagnetic force having a predetermined magnitude when power is applied thereto.

The core 330 may be fixedly disposed above the base member 310 on which a printed circuit board (not shown) having pattern circuits printed thereon is disposed, a plurality of coil holes having a predetermined size may be formed in an upper surface of the base member 310 facing the core 330 having the coil 320 wound therearound while penetrating through the base member 310, such that the coil 320 is exposed downwardly, and the coil 320 may be electrically connected to the printed circuit board so that external power may be supplied thereto.

The base member 310 may be coupled to the holder 340 to which the core 330 may be fixed.

An outer circumferential surface of the holder 340 is formed to be stepped so that the core 330 may be stably fixed.

The base member 310 may be manufactured by die-casting an aluminum (Al) material or be manufactured by performing plastic working (for example, press working) on a steel sheet.

Figure 4:
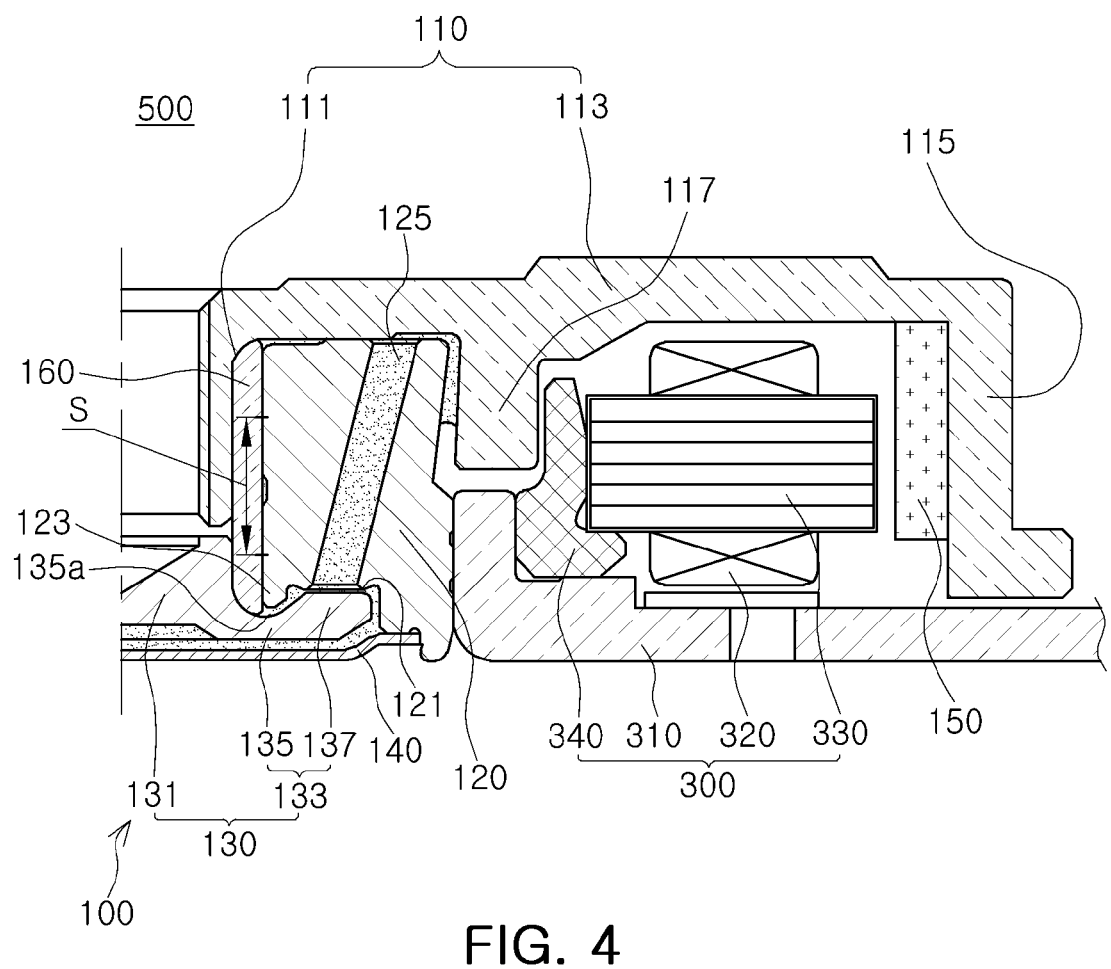
FIG. 4 is a half cross-sectional view of a spindle motor according to a second embodiment of the present invention.
Figure 5:
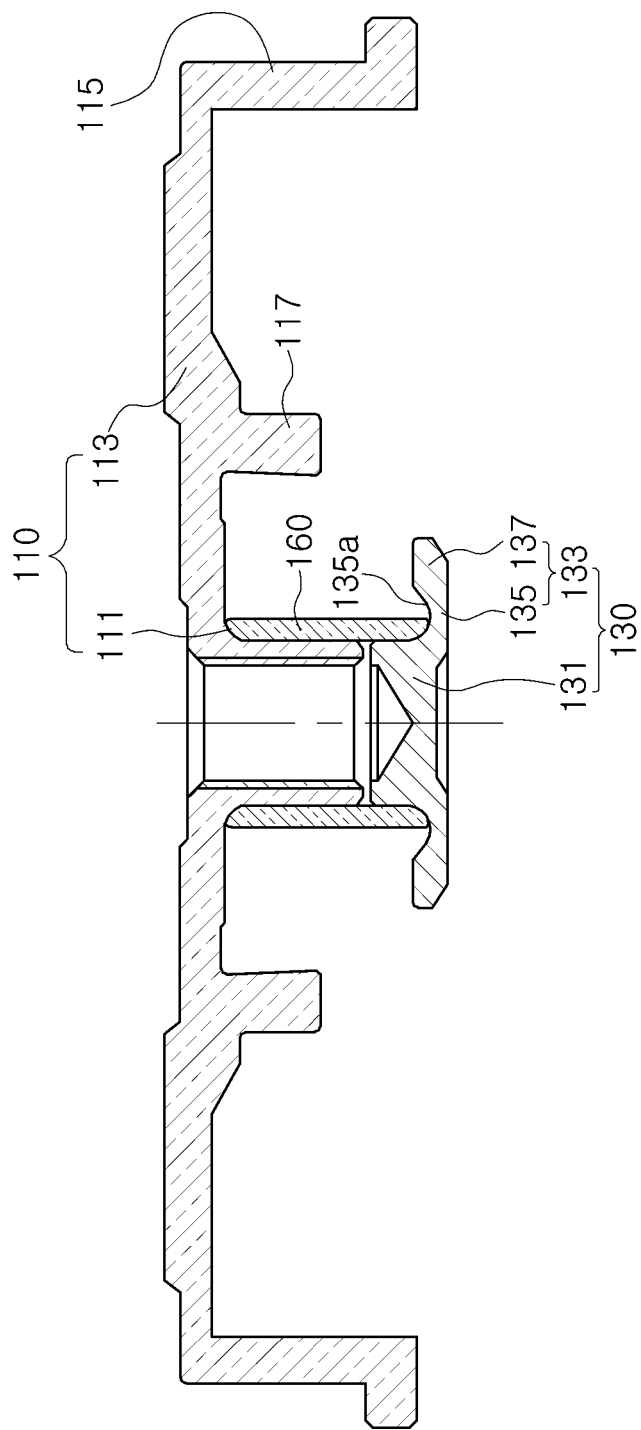
FIG. 5 is a cross-sectional view of a rotating member, a stopper, and a shaft housing of the spindle motor according to the second embodiment of the present invention.
Figure 6:
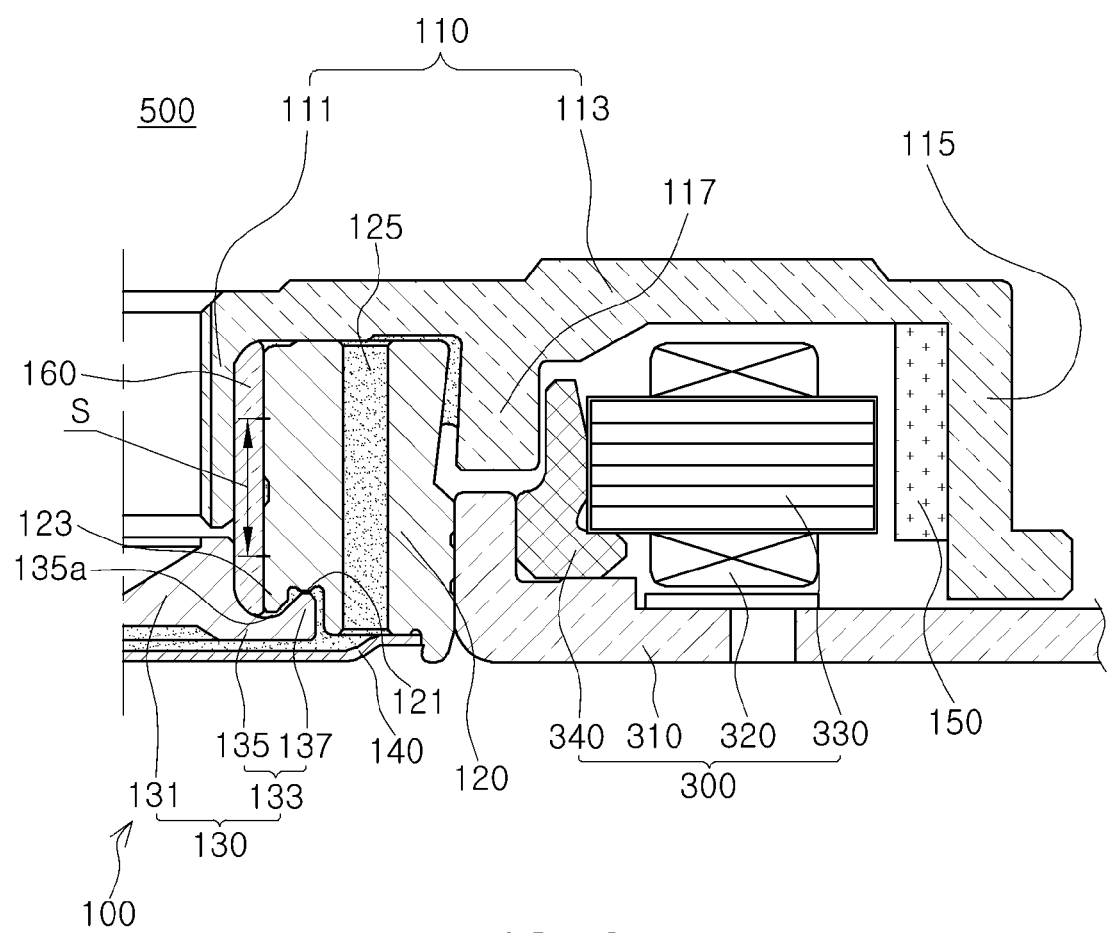
FIG. 6 is a half cross-sectional view of a modified example of a bypass channel in the spindle motor according to the second embodiment of the present invention.

FIG. 4 is a half cross-sectional view of a spindle motor according to a second embodiment of the invention, FIG. 5 is a cross-sectional view of a rotating member, a stopper, and a shaft housing of the spindle motor according to the second embodiment of the invention, and FIG. 6 is a half cross-sectional view of a modified example of a bypass channel in the spindle motor according to the second embodiment of the invention.

Referring to FIGS. 4 through 6, a spindle motor 500 according to the second embodiment of the invention is the same as the spindle motor 400 according to the first embodiment of the invention, except for a shaft housing 160, and thus detailed descriptions, except for the description of the shaft housing 160, will be omitted.

The shaft housing 160 may have a hollow cylindrical shape and the shaft 111 may be fixedly inserted into the hollow of the shaft housing 160.

That is, in the spindle motor 500 according to the second embodiment of the invention, the shaft 111 may be fixed to the shaft housing 160 to configure the rotating member 110 along with the shaft housing 160.

In this configuration, the shaft housing 160 may be inserted into the shaft hole of the sleeve 120, having a micro clearance between the shaft housing 160 and the shaft hole of the sleeve 120. The micro clearance may be filled with a lubricating fluid, and the rotation of the shaft 110 may be more smoothly supported by a radial dynamic pressure groove (not shown) formed in at least one of an outer diameter of the shaft housing 160 and an inner diameter of the sleeve 120.

The radial dynamic pressure groove may be formed in the inner circumferential surface of the sleeve 120, the inner portion of the shaft hole of the sleeve 120, and generate pressure so that the shaft housing 160 may smoothly rotate in the state in which the shaft housing 160 is spaced apart from the inner circumferential surface of the sleeve 120 by a predetermined interval at the time of the rotation of the rotating member 110.

However, as described above, the radial dynamic pressure groove is not limited to being disposed in the inner circumferential surface of the sleeve 120. Therefore, it is to be noted that the radial dynamic pressure groove may also be disposed in an outer circumferential surface of the shaft housing 160 and the number of radial dynamic pressure grooves is not limited.

The radial dynamic pressure groove may have any one of a herringbone pattern, a spiral pattern, and a helical pattern. However, the radial dynamic pressure groove may have any pattern as long as it may generate radial dynamic pressure.

Figure 7:
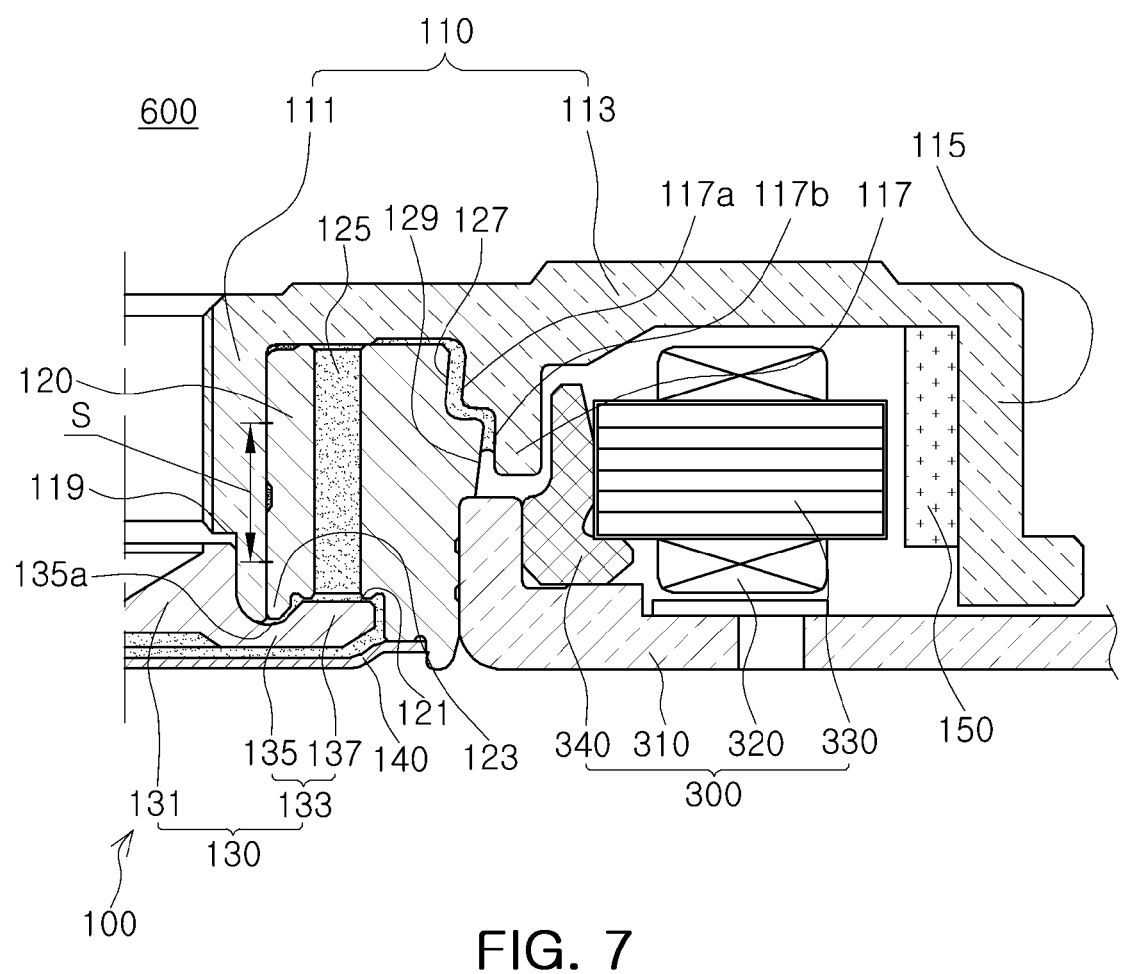
FIG. 7 is a half cross-sectional view of a spindle motor according to a third embodiment of the present invention.
Figure 8:
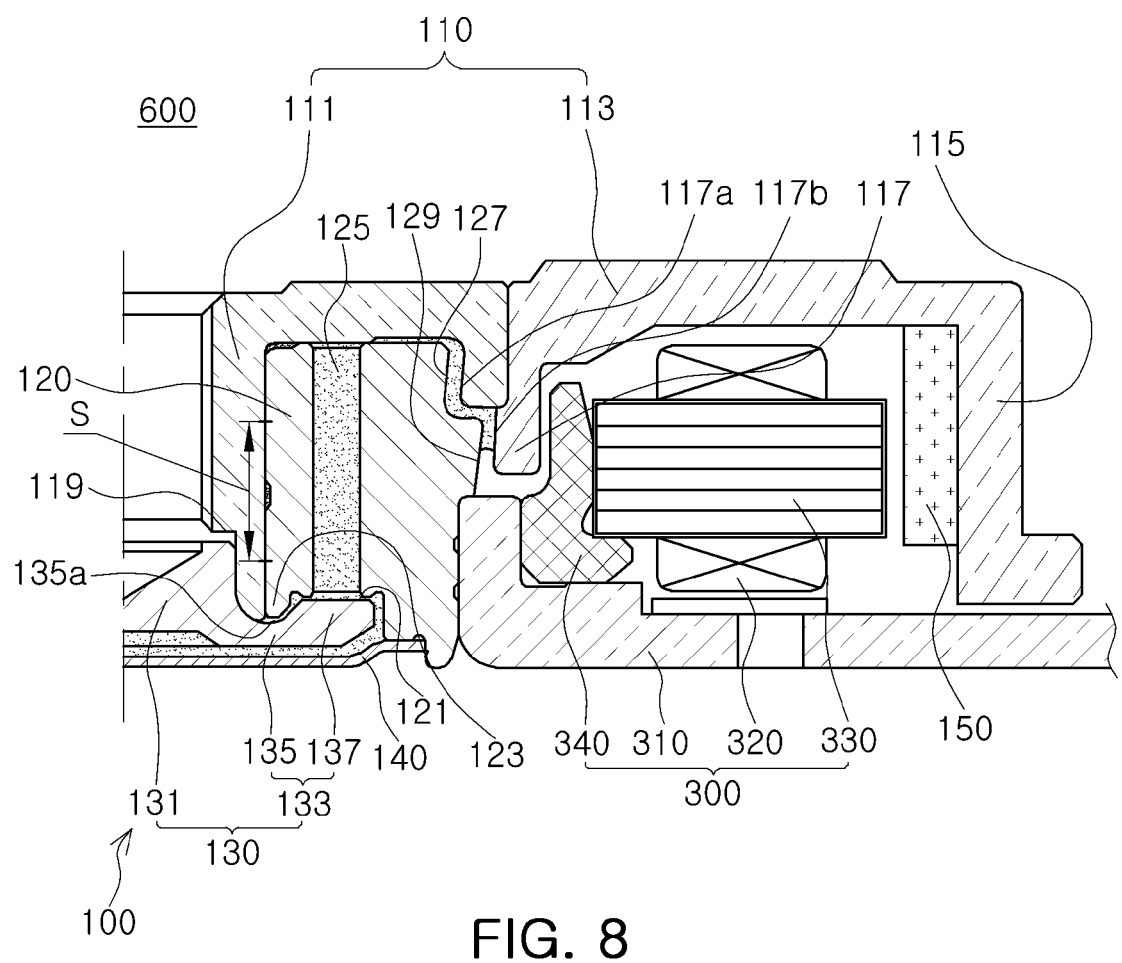
FIG. 8 is a half cross-sectional view of a modified example of a rotating member of the spindle motor according to the third embodiment of the present invention.

FIG. 7 is a half cross-sectional view of a spindle motor according to a third embodiment of the invention and FIG. 8 is a half cross-sectional view of a modified example of a rotating member of the spindle motor according to the third embodiment of the invention.

Referring to FIGS. 7 and 8, a spindle motor 600 according to the third embodiment of the invention is the same as the spindle motor according to the first embodiment of the invention, except for the sealing of the lubricating fluid and thus, detailed descriptions, except for the description of the lubricating fluid, will be omitted.

In the spindle motor 600 according to the third embodiment of the invention, an outer circumferential surface of an upper end portion of the sleeve 120 may be recessed in an inner radial direction.

Here, the outer circumferential surface of the upper end portion of the sleeve 120 recessed in the inner radial direction may be referred to as a first outer circumferential surface 127 and an outer circumferential surface of a portion of the sleeve 120 adjacent to the first outer circumferential surface 127 may be referred to as a second outer circumferential surface 129.

Therefore, the first outer circumferential surface 127 may be disposed inwardly of the second outer circumferential surface 129 in the inner radial direction and the outer circumferential surface of the sleeve 120 may be stepped.

That is, the second outer circumferential surface 129 may protrude in an outer radial direction further than the first outer circumferential surface 127, and the upper end portion of the sleeve 120 may be formed to have a smaller diameter than those of other portions of the sleeve 120.

The outer circumferential surface of the sleeve 120 may face the inner circumferential surface of the main wall part 117 included in the rotating member 110, and the shape of the inner circumferential surface of the main wall part 117 may correspond to the shape of the outer circumferential surface of the sleeve 120.

Therefore, the main wall part 117 may include a first inner circumferential surface 117a of which the inner diameter is formed to be relatively small and a second inner circumferential surface 117b of which the inner diameter is formed to be relatively large.

In other words, the first outer circumferential surface 127 of the sleeve 120 may face the first inner circumferential surface 117a of the main wall part 117 and the second outer circumferential surface 129 of the sleeve 120 may face the second inner circumferential surface 117b of the main wall part 117.

The lubricating fluid may be sealed between the second outer circumferential surface 129 of the sleeve 120 and the second inner circumferential surface 117b of the main wall part 117.

For the sealing of the lubricating fluid, at least one of the second outer circumferential surface 129 of the sleeve 120 and the second inner circumferential surface 117b of the main wall part 117 may be formed to be tapered.

Therefore, the spindle motor 600 according to the third embodiment of the invention may secure a larger storage space for the lubricating fluid as compared with the spindle motor 400 according to the first embodiment of the invention.

The lubricating fluid may be gradually reduced due to factors such as the leakage or evaporation of the lubrication fluid, and the like, during the driving of the spindle motor, and therefore sufficient lubricating pressure may not be provided, which may seriously affect the driving of the spindle motor. However, the spindle motor 500 according to the third embodiment of the invention may sufficiently secure the storage space for the lubricating fluid to thereby increase the lifespan of the spindle motor.

Further, the first outer circumferential surface 127 of the sleeve 120 and the first inner circumferential surface 117a of the main wall part 117 may also be formed to be tapered.

Therefore, even though an interface between the lubricating fluid and air gradually moves upwardly in an axial direction due to a reduction in the amount of the lubricating fluid due to the leakage or evaporation of the lubricating fluid, the lubricating fluid may be continuously sealed by a tapered structure between the outer circumferential surface of the sleeve 120 and the inner circumferential surface of the main wall part 117.

Therefore, the leakage of the lubricating fluid may be effectively prevented.

Meanwhile, as illustrated in FIG. 7, the rotating member 110 may be formed integrally, but the embodiment of the invention is not limited thereto. Alternatively, as illustrated in FIG. 8, the rotating member 110 may be formed by coupling separate members with each other.

Figure 9:
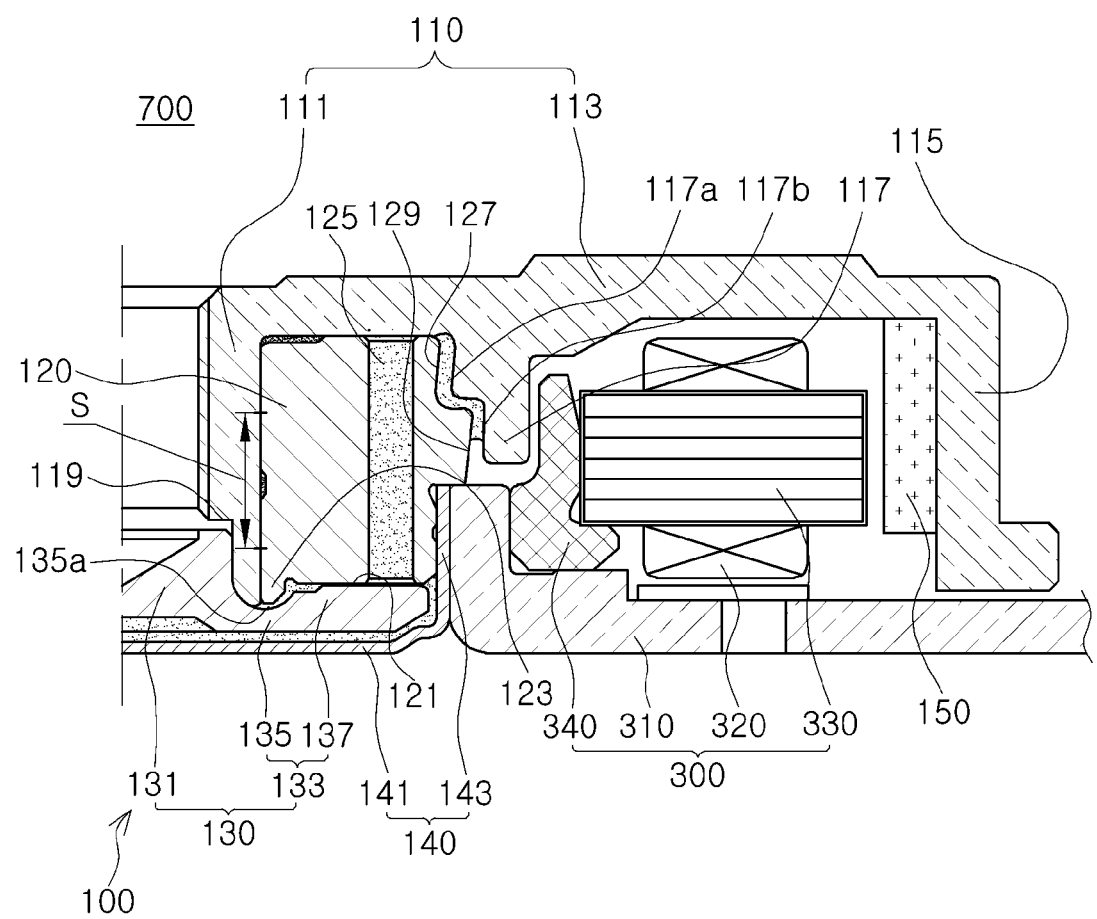
FIG. 9 is a half cross-sectional view of a spindle motor according to a fourth embodiment of the present invention.

FIG. 9 is a half cross-sectional view of a spindle motor according to a fourth embodiment of the invention.

Referring to FIG. 9, a spindle motor 700 according to the fourth embodiment of the invention is the same as the spindle motor 600 according to the third embodiment of the invention, except for the cover plate 140, and thus detailed descriptions, except for the description of the cover plate 140, will be omitted.

The cover plate 140 may include a closed part 141 disposed below the shaft 111 and the sleeve 120 and a bent part 143 extending from the closed part 141 in an axial direction and fixed to the sleeve 120 and the base member 310.

The closed part 141 may be disposed to allow a clearance between the shaft 111 and the lower portion of the sleeve 120 to be maintained and the bent part 143 may be extended from the closed part 141 in the axial direction.

The bent part 143 may be coupled to the outer circumferential surface of the sleeve 120 and the inner circumferential surface of the base member 310 to fix the sleeve 120.

That is, the bent part 143 may be disposed between the sleeve 120 and the base member 310.

Here, the cover plate 140 may be formed by plastically deforming an iron-based steel sheet. Specifically, after a basic shape of the cover plate 140 is formed by press working, a final shape thereof may be obtained by additional working such as bending or cutting.

That is, the cover plate 140 according to the embodiment of the invention may be manufactured by performing a single process by plastic working such as press working, or the like, or an additional process on a cold rolled steel sheet (SPCC, SPCE, or the like), a hot rolled steel sheet, stainless steel, a lightweight alloy steel sheet including a boron or magnesium alloy, or the like.

Therefore, the cover plate 140 according to the embodiment of the invention significantly decreases a required processing time and energy consumption, thereby improving productivity.

In addition, since the cover plate 140 is manufactured using an iron-based steel sheet or alloy, the overall rigidity of the spindle motor may be improved.

Since the bent part 143 of the cover plate 140 is disposed between the sleeve 120 and the base member 310, even when there is a load or an external impact in an axial direction or a radial direction, the bent part 143 of the cover plate 140 supports the sleeve 120 and the base member 310, thereby preventing the internal components from being deformed.

Figure 10:
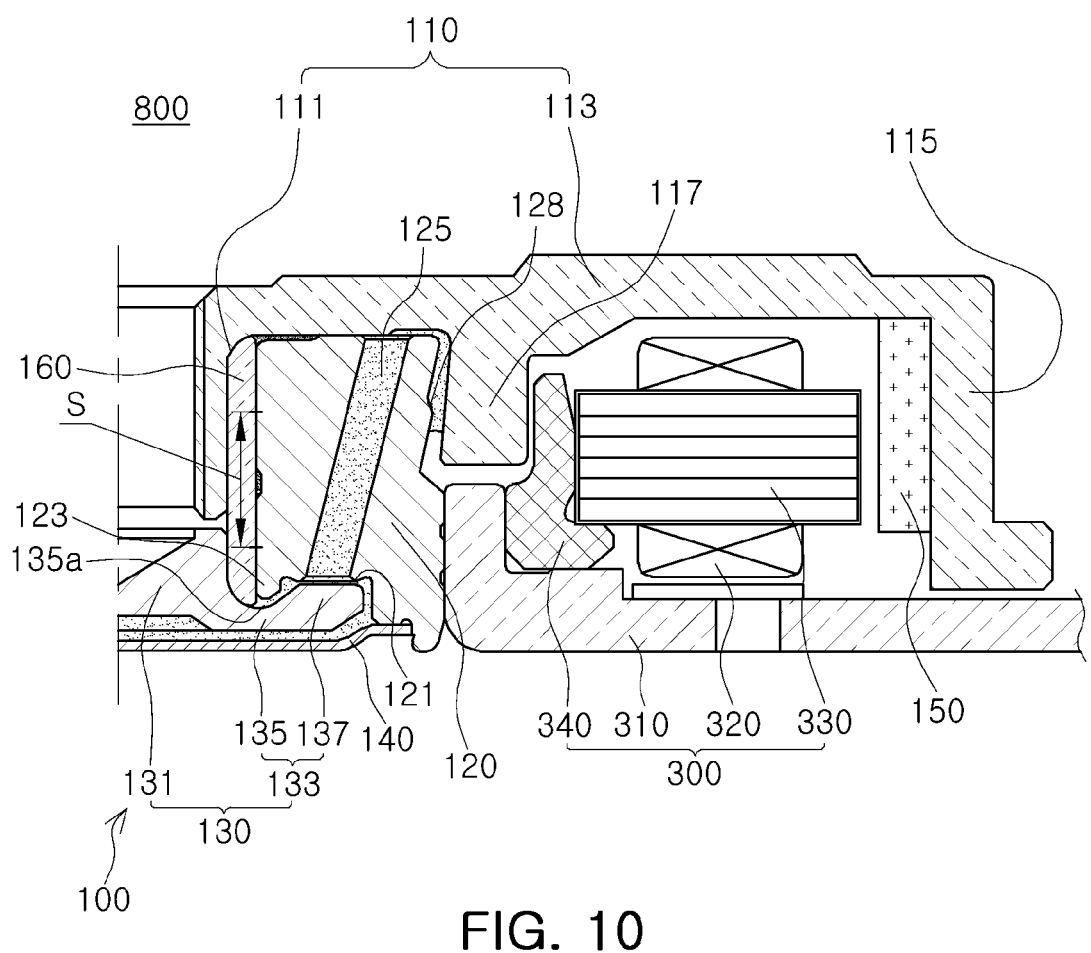
FIG. 10 is a half cross-sectional view of a spindle motor according to a fifth embodiment of the present invention.
Figure 11:
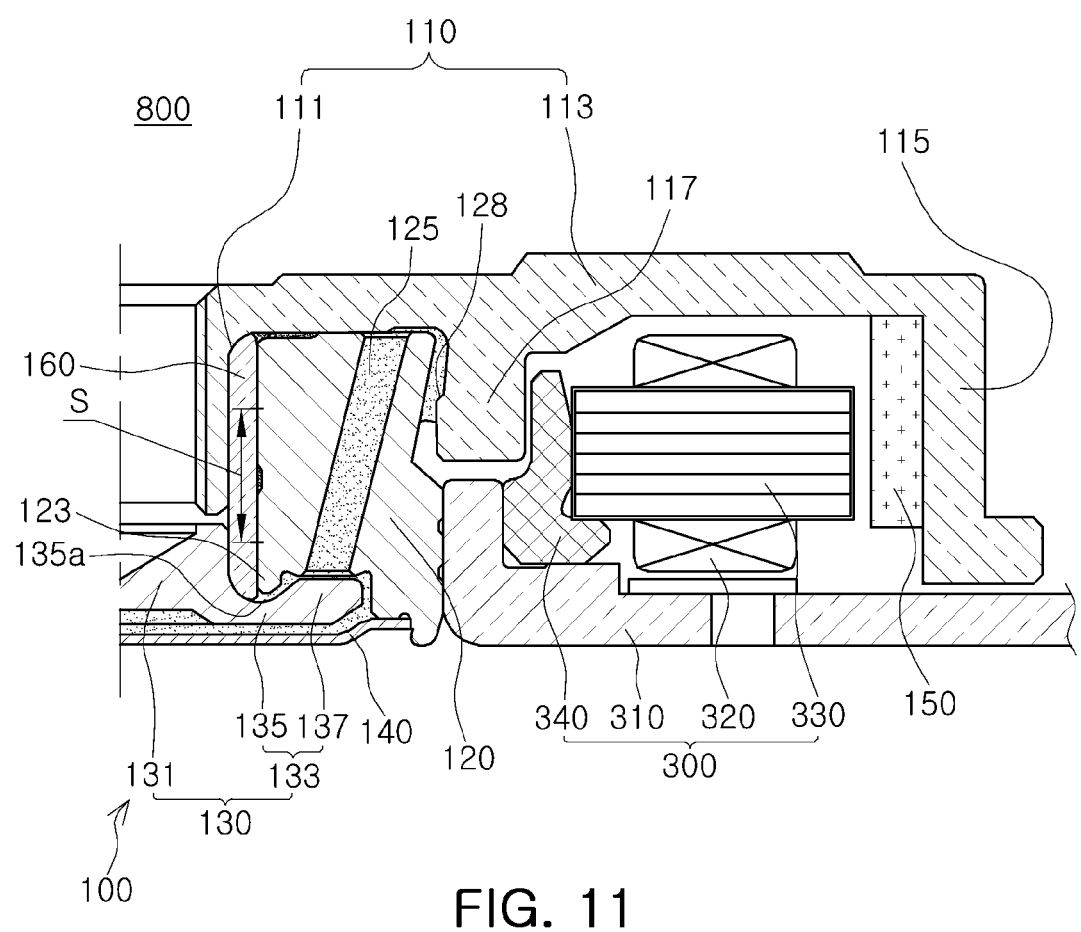
FIG. 11 is a half cross-sectional view of a modified example of a step part in the spindle motor according to the fifth embodiment of the present invention.

FIG. 10 is a half cross-sectional view of a spindle motor according to a fifth embodiment of the invention and FIG. 11 is a half cross-sectional view of a modified example of a step part in the spindle motor according to the fifth embodiment of the invention.

Referring to FIGS. 10 and 11, a spindle motor 800 according to the fifth embodiment of the invention is the same as the spindle motor 500 according to the second embodiment of the invention, except for a step part 128, and thus, detailed descriptions, except for the description of the step part 128, will be omitted.

The lubricating fluid may be sealed between the outer circumferential surface of the sleeve 120 and the inner circumferential surface of the main wall part 117 and at least one of the outer circumferential surface of the sleeve 120 and the inner circumferential surface of the main wall part 117 may be formed to be tapered.

Here, the outer circumferential surface of the sleeve 120 may be provided with at least one step part 128 to change a size of the micro clearance between the outer circumferential surface of the sleeve 120 and the inner circumferential surface of the main wall part 117.

That is, the outer circumferential surface of the sleeve 120 may be formed to be stepped so that the storage space for the lubricating fluid may be more secured due to such a stepped structure.

The lubricating fluid may be gradually reduced due to factors, such as the leakage or evaporation of the lubrication fluid, and the like, during the driving of the spindle motor, and therefore, sufficient lubricating pressure may not be provided, which may seriously affect the driving of the spindle motor. However, the spindle motor 800 according to the fifth embodiment of the invention sufficiently may secure the storage space for the lubricating fluid to thereby increase the lifespan of the spindle motor.

Therefore, even though an interface between the lubricating fluid and air gradually moves upwardly in the axial direction due to a reduction in the amount of the lubricating fluid due to the leakage or evaporation of the lubricating fluid, the lubricating fluid may be continuously sealed by the tapered structure between the outer circumferential surface of the sleeve 120 and the inner circumferential surface of the main wall part 117.

Therefore, the leakage of the lubricating fluid may be effectively prevented.

Here, as illustrated in FIG. 10, the step part 128 may be formed on the outer circumferential surface of the sleeve 120, but the embodiment of the invention is not limited thereto.

Alternatively, as illustrated in FIG. 11, the step part 128 may be formed on the inner circumferential surface of the main wall part 117.

Figure 12:
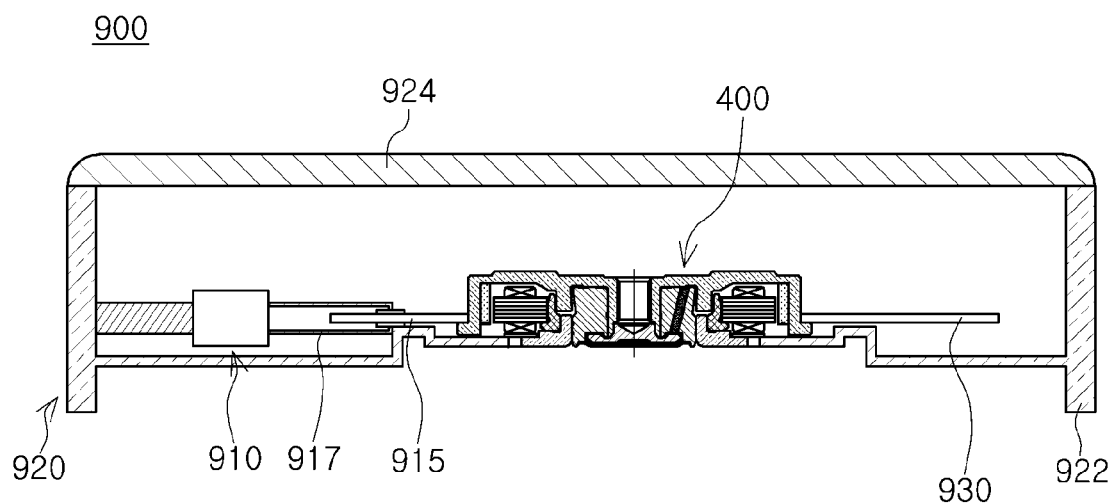
FIG. 12 is a schematic cross-sectional view of a disk driving device using the spindle motor according to an embodiment of the present invention.

FIG. 12 is a schematic cross-sectional view of a disk driving device using the spindle motor according to an embodiment of the invention.

Referring to FIG. 12, a recording disk driving device 900 having the spindle motor according to the embodiment of the invention mounted therein may be a hard disk driving device and may include the spindle motor 400, 500, 600, 700 or 800, a head driving unit 910, and a housing 920.

Here, the spindle motor may have all the characteristics of the spindle motors 400, 500, 600, 700 and 800 according to the above-described embodiments of the invention and have a recording disk 930 mounted thereon.

The head driving unit 910 may transfer a magnetic head 915 detecting information of the recording disk 930 mounted in the spindle motor 400 to a surface of the recording disk 930 to be detected.

Here, the magnetic head 915 may be disposed on a support part 917 of the head driving unit 910.

The housing 920 may include a motor mounting plate 922 and a top cover 924 shielding an upper portion of the motor mounting plate 922 in order to form an internal space receiving the spindle motor and the head driving unit 910.

As set forth above, according to the embodiments of the invention, the rigidity of the spindle motor can be improved and the storage space of the lubricating fluid can be increased.

Further, according to the embodiments of the invention, the manufacturing process of the spindle motor can be simplified and the manufacturing costs thereof can be saved, by reducing the number of components in the spindle motor.

In addition, according to the embodiments of the invention, the bearing rigidity can be increased with the increase in the bearing span length while satisfying the demand for the miniaturization and thinness of the spindle motor.

While the present invention has been shown and described in connection with the embodiments, it will be apparent to those skilled in the art that modifications and variations can be made without departing from the spirit and scope of the invention as defined by the appended claims.

What is claimed is:

1. A spindle motor, comprising:
a rotating member including a shaft having a fixing groove disposed in a lower portion thereof, a hub base extending from an upper end of the shaft in an outer radial direction, and a magnet support part extending from an outer edge of the hub base downwardly in an axial direction;
a sleeve rotatably supporting the rotating member; and
a stopper including a fixed part inserted into the fixing groove and a flange part extending from an end of the fixed part in the outer radial direction,
wherein the flange part includes a groove part formed by being recessed inwardly and an extension part extending from the groove part in the outer radial direction.

2. The spindle motor of claim 1, wherein the extension part is thicker than the groove part.

3. The spindle motor of claim 1, wherein a lower portion of the sleeve is provided with a receiving groove recessed inwardly therefrom, and
the receiving groove has the extension part received therein.

4. The spindle motor of claim 1, wherein a lower end of the sleeve is provided with a protrusion, and
the protrusion is received by the groove part.

5. The spindle motor of claim 1, wherein the groove part is formed to be rounded.

6. The spindle motor of claim 1, wherein the rotating member includes a main wall part protruding from a surface thereof downwardly in the axial direction and facing the sleeve, and
a lubricating fluid is sealed between an inner circumferential surface of the main wall part and an outer circumferential surface of the sleeve.

7. The spindle motor of claim 6, wherein the sleeve includes a first outer circumferential surface and a second outer circumferential surface protruding in the outer radial direction further than the first outer circumferential surface, and
the main wall part includes a first inner circumferential surface facing the first outer circumferential surface of the sleeve and a second inner circumferential surface facing the second outer circumferential surface of the sleeve.

8. The spindle motor of claim 7, wherein the lubricating fluid is sealed between the second outer circumferential surface of the sleeve and the second inner circumferential surface of the main wall part.

9. The spindle motor of claim 1, wherein the sleeve is provided with a bypass channel penetrating through upper and lower portions of the sleeve.

10. A spindle motor, comprising:
a rotating member including a shaft having a fixing groove disposed in a lower portion thereof, a hub base extending from an upper end of the shaft in an outer radial direction, and a magnet support part extending from an outer edge of the hub base downwardly in an axial direction;
a shaft housing into which the shaft is inserted;
a sleeve rotatably supporting the shaft housing; and
a stopper including a fixed part inserted into the fixing groove and a flange part extending from an end of the fixed part in the outer radial direction,
wherein the flange part includes a groove part formed by being recessed inwardly and an extension part extending from the groove part in the outer radial direction.

11. The spindle motor of claim 10, wherein the extension part is thicker than the groove part.

12. The spindle motor of claim 10, wherein a lower portion of the sleeve is provided with a receiving groove recessed inwardly therefrom, and
the receiving groove has the extension part received therein.

13. The spindle motor of claim 10, wherein a lower end of the sleeve is provided with a protrusion, and
the protrusion is received by the groove part.

14. A hard disk drive, comprising:
the spindle motor of claim 1 rotating a disk using power applied thereto through a substrate;
a magnetic head recording and reproducing data on the disk; and
a head driving unit moving the magnetic head to a predetermined position above the disk.

15. A hard disk drive, comprising:
the spindle motor of claim 10 rotating a disk using power applied thereto through a substrate;
a magnetic head recording and reproducing data on the disk; and
a head driving unit moving the magnetic head to a predetermined position above the disk.

* * * * *